(12) United States Patent
Opaterny

(10) Patent No.: US 8,627,297 B2
(45) Date of Patent: Jan. 7, 2014

(54) METHOD FOR EVALUATING AT LEAST ONE CHARACTERISTIC VALUE

(75) Inventor: Thilo Opaterny, Nürnberg (DE)

(73) Assignee: Seimens Aktiengesellschaft, München (DE)

( * ) Notice: Subject to any disclaimer, the term of this patent is extended or adjusted under 35 U.S.C. 154(b) by 1345 days.

(21) Appl. No.: 12/217,056

(22) Filed: Jul. 1, 2008

(65) Prior Publication Data

US 2009/0013314 A1    Jan. 8, 2009

(30) Foreign Application Priority Data

Jul. 2, 2007 (EP) .................................. 07012960

(51) Int. Cl.
G06F 9/45 (2006.01)

(52) U.S. Cl.
USPC .............................. 717/144; 717/141; 717/143

(58) Field of Classification Search
None
See application file for complete search history.

(56) References Cited

U.S. PATENT DOCUMENTS

| | | | | | |
|---|---|---|---|---|---|
| 5,500,881 | A | * | 3/1996 | Levin et al. ................... | 717/141 |
| 5,535,394 | A | * | 7/1996 | Burke et al. .................. | 717/144 |
| 5,555,417 | A | * | 9/1996 | Odnert et al. ................. | 717/144 |
| 5,701,489 | A | * | 12/1997 | Bates et al. .................... | 717/144 |
| 6,009,273 | A | * | 12/1999 | Ayers et al. .................... | 717/143 |
| 6,131,188 | A | * | 10/2000 | Goebel ........................ | 717/141 |
| 6,135,650 | A | * | 10/2000 | Goebel ........................ | 717/143 |
| 6,961,930 | B1 | * | 11/2005 | Waldspurger et al. ......... | 717/141 |
| 7,292,964 | B1 | * | 11/2007 | Mukherjee et al. ............. | 703/1 |
| 7,310,784 | B1 | * | 12/2007 | Gottlieb et al. ............... | 715/853 |
| 7,549,144 | B2 | * | 6/2009 | Jubran ......................... | 717/143 |
| 7,714,864 | B2 | * | 5/2010 | Cahill et al. .................. | 345/440 |
| 7,886,272 | B1 | * | 2/2011 | Episkopos et al. ............. | 717/124 |
| 2001/0037492 | A1 | * | 11/2001 | Holzmann ....................... | 717/4 |
| 2002/0091990 | A1 | * | 7/2002 | Little et al. .................... | 717/105 |
| 2004/0031015 | A1 | * | 2/2004 | Ben-Romdhane et al. ... | 717/107 |
| 2004/0210426 | A1 | * | 10/2004 | Wood ................................ | 703/2 |
| 2004/0257361 | A1 | * | 12/2004 | Tabakman et al. ............ | 345/419 |
| 2005/0200627 | A1 | * | 9/2005 | Desylva ........................ | 345/520 |
| 2006/0101435 | A1 | * | 5/2006 | Akilov et al. .................. | 717/141 |

(Continued)

OTHER PUBLICATIONS

Tim Jones, "Visualize function calls with Graphviz", IBM, Jun. 21, 2005, <http://www.ibm.com/developerworks/library/l-graphvis/>, pp. 1-9.*

(Continued)

*Primary Examiner* — Thuy Dao
*Assistant Examiner* — Samuel Hayim

(57) ABSTRACT

For the purpose of evaluating at least one characteristic value of at least one function in the execution of a program, a method uses a graphical representation of the at least one determined characteristic value associated with the functions. The representation is subdivided into a hierarchical structure, dependent on the degree of call depth of the function, and each call of a function in the graphical representation occupies an area whose size is dependent on the associated determined characteristic value in each case. In this context characteristic values can be any variables that are measurable by means of a profiler, as already explained in the introduction. Typically, an execution of a program is initiated via the calling of first functions, also referred to hereinafter as call depth 1. Said functions may possibly call further functions, i.e. of call depth 2, and so on, until processing of the desired task has been completed. At the same time functions can also be called multiple times and by all means from multiple call depths, a function not being specified in terms of call depth.

10 Claims, 2 Drawing Sheets

(56) References Cited

U.S. PATENT DOCUMENTS

| | | | | |
|---|---|---|---|---|
| 2006/0190923 | A1* | 8/2006 | Jubran | 717/104 |
| 2007/0240138 | A1* | 10/2007 | Chess et al. | 717/143 |
| 2008/0033812 | A1* | 2/2008 | McKenna et al. | 705/14 |
| 2008/0120543 | A1* | 5/2008 | Cahill et al. | 715/700 |
| 2008/0304632 | A1* | 12/2008 | Catlin et al. | 379/88.04 |
| 2008/0304650 | A1* | 12/2008 | Catlin et al. | 379/298 |

OTHER PUBLICATIONS

David Forney, "Codes on Graphs: Normal Realizations", IEEE, 2001, <http://ieeexplore.ieee.org/stamp/stamp.jsp?tp=&arnumber=910573>, pp. 1-29.*

Dmitry Malioutov et al., "Walk-Sums and Belief Propagation in Gaussian Graphical Models", MIT Press, 2006, <http://delivery.acm.org/10.1145/1250000/1248620/7-2031-malioutov.pdf>, pp. 1-34.*

Domenic A. Varley; "Short Communication—Practical Experience of the Limitations of GPROF"; Software—Practice and Experience; vol. 23, No. 4; Apr. 1993; pp. 461-463; XP 000655840.

Juergen Rilling and S.P. Mudur; "On the use of Metaballs to Visually Map Source Code Structures and Analysis Results onto 3D Space"; Proceedings of the Ninth Working Conference on Reverse Engineering; Oct. 29-Nov. 1, 2002; pp. 299-308; IEEE, Piscatawat, NJ, USA; XP010624982.

Steven P. Reiss; "A Framework for Abstract 3D Visualization"; Visual Languages, Aug. 24, 1993; pp. 108-115; Proceedings 1993 IEEEE Symposium on Bergen, Norway; Los Analmits, CA, USA, IEEE Comput. Soc. US; XP010032702.

Susan L. Graham, Peter B. Kessler, Marshall K. McKusick; "gprof: a Call Graph Execution Profiler"; Jun. 6, 1982; pp. 120-126; vol. 17 No. 6; XP002451925.

* cited by examiner

FIG 1
| Function | Number | Cumul Time | Own Time |
|---|---|---|---|
|  |  |  |  |
| A | 567 | 872 | 436 |
| B | 56745 | 43478 | 567 |
| C | 464 | 234234 | 34577 |
| D | 1 | 4745748 | 125 |
| E | 4568 | 2355 | 34872 |
FIG 2
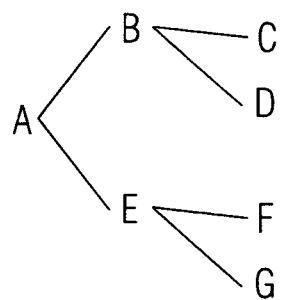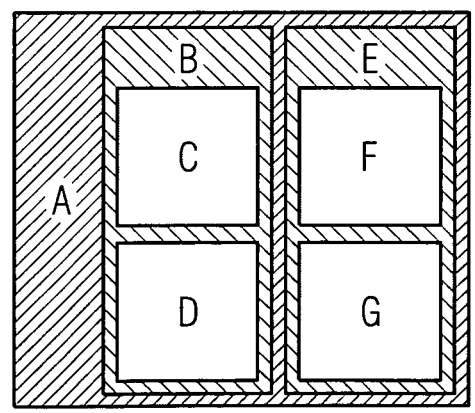

METHOD FOR EVALUATING AT LEAST ONE CHARACTERISTIC VALUE

CROSS REFERENCE TO RELATED APPLICATIONS

This application claims priority of European Patent Office application No. 07012960.6 EP filed Jul. 2, 2007, which is incorporated by reference herein in its entirety.

FIELD OF INVENTION

The invention relates to a method for evaluating at least one characteristic value of at least one function in the execution of a program, in particular during the development of software, for example when pinpointing, diagnosing and removing faults and errors in hardware and software.

BACKGROUND OF INVENTION

When developing a program, the developer attempts to avoid anything that is unnecessary so that the program will be sufficiently fast and the full processing of the task can be completed within the given timeframe.

Occasionally, however, the general conditions change even during the development process and the execution of a program previously delivering adequate performance is compromised.

Runtimes of the functions within a program are typically investigated through the use of what is termed a profiler. Profilers are programming tools which analyze the runtime behavior of software. In software development there are different problem areas that are triggered by inefficient programming. A profiler assists the developer in identifying the problem areas by analyzing and comparing executing programs. From this process measures aimed at the structural and algorithmic improvement of the source code can be derived.

The most frequent application of a profiler is counting and measuring the calls and iterations of functions. This enables the programmer to discover where it is worthwhile optimizing the program. Optimizing functions that are not often used is not especially beneficial to the overall performance of the program and generally makes maintaining the source code more difficult. For this reason the main focus of attention is on functions which are called frequently and take up a lot of time among the total number of calls.

A further aspect is the tracking of memory usage by a program. The profiler is intended to help here in optimizing the use and consumption of working memory and where necessary in identifying errors in the programming due to which memory areas that are no longer being used are not released. Modern profilers provide the possibility of representing concurrent processes graphically in their lifecycle (as a barchart or reference tree, for example). This visualization is intended to help a programmer to interpret the runtime behavior of concurrent processes more effectively and pinpoint errors due to deadlock.

SUMMARY OF INVENTION

A table is usually generated by the profiler during the measurement of the functions, exact duration and frequency of execution of the functions in a particular scenario.

This table can include e.g. the following columns:
1. Name of the function
2. How often was the function called?
3. How long did the calls last in total?
4. How much of that time was consumed overall (net) within the function itself and in functions called therein in turn?
5. By which functions was the function called?
   a. and how often?
6. How much time did the fastest execution of the function take?
   a. Own time (net)?
   b. Total (gross)?
7. How much time did the slowest execution of the function take?
   a. Own time (net)?
   b. Total (gross)?
8. Variance of the individual execution times
   a. Own time (net)?
   b. Total (gross)?

The above-listed values do not constitute a definitive listing, and further values can be determined by the profiler. The question as to the further functions called from within the measured function (in other words, functions hierarchically situated at the next call level) by itself also already fills a further table again. Depending on the complexity of the program/function tested by the profiler, this results in a growing volume of data which makes it difficult for the user, tester and/or programmer to find the function that is suitable for optimization in the chaotic mass of data.

As an example of a results table of a profiler, let reference be made to the table of FIG. 1, which has a total of three values—Number, Cumul(ative) Time and Own Time—in each case for the five functions A, B, C, D, E, and which represents a snapshot during the measurement process.

In this example, the function D, although running for the longest time overall, is itself only called once and requires only a small part of the time as own time. Function B, in contrast, is called very frequently, i.e. if said function can be successfully optimized, this would have a great impact on the cumulative time. Function B in turn requires only a small part of the time as own time, which suggests that an optimization within the function B will be difficult. Function E, conversely, requires a great deal of own time, so a small optimization in this function will possibly lead to a higher savings effect. It could, however, also be the case that the function is called so often because there is an error in the programming, for example.

The interpretation of the values is already demanding per se, so with a multiplicity of numbers it becomes virtually impossible to maintain an overview here. Filters and sorting of the values in the table are currently available as tools.

An object of the invention is to disclose a method by means of which it is made easier for a user to evaluate the determined characteristic values.

This object is achieved by means of a method as claimed in an independent claim. For the purpose of evaluating at least one characteristic value of at least one function in the execution of a program, the method uses a graphical representation of the at least one determined characteristic value associated with the functions.

The representation is subdivided into a hierarchical structure, dependent on the degree of call depth of the function, and each call of a function in the graphical representation occupies an area whose size is dependent on the associated determined characteristic value in each case.

Characteristic values can be any variables that are measurable by means of a profiler, as already explained in the introduction.

Typically, an execution of a program is initiated via the calling of first functions, also referred to hereinafter as call depth 1. Said functions possibly call further functions, i.e. of call depth 2, and so on, until processing of the desired task has been completed. At the same time functions can also be called multiple times and by all means from multiple call depths, a function not being specified in terms of call depth.

The call depth of the function in question is mapped in what is called a hierarchical subdivision of the graphical representation. Suitable elements here are for example nested areas. It is advantageous in this case to use the already known tree mapping algorithm formulated by Shneiderman, which was originally developed for the purpose of visualizing directory trees.

Advantageous embodiment and developments are set forth in the dependent claims.

The hierarchical subdivision can be performed in such a way that the function called the main function, which is called first in the program (call level 0, for example main( )), initially occupies the entire representation area.

The first call level of the functions which are called in succession by the main function then subdivides the available area of the main function in a first manner. The following call level 2 of the functions subdivides the area of the function calling them in each case from the respective previous call level in a defined manner and this step is repeated iteratively as required.

In this case the subdivision of the area in the first and each following step can be performed, for example, horizontally and vertically in alternation. As a result, the areas remain visually clearly separable and labeling is possible.

Advantageously, the represented characteristic value is a value which provides highly pertinent information for the evaluation and discovery of problem areas in program development. Values that should be mentioned first and foremost in this context are the total execution time of the function and also the execution frequency of the function.

In a development of the invention, a three-dimensional form of representation, in particular a cushion shape of the respective representation areas is chosen. In this case the base area of the cushion is determined according to a first characteristic value and the height of the cushion according to a second characteristic value that is different from the first.

Filter options can additionally be advantageously used to reduce the represented volume of data so that it can be more easily evaluated.

Since a profiler measures the characteristic values during ongoing program operation, said values also change dynamically at runtime. It is therefore a further advantage of the invention if the areas can be adjusted in size to match the currently determined characteristic variable value in each case. This generates an image which is dynamic along the time axis and which, by means of the changes that can be represented therewith, can provide a further important pointer to problems in the problems in the program execution, for example if an area (which represents a function) grows to an above-average extent or exhibits some other unexpected behavior compared to other functions.

BRIEF DESCRIPTION OF THE DRAWINGS

The invention is explained below with reference to exemplary embodiments and the accompanying drawings, in which:

FIG. 1 shows, as already described in the introduction, an exemplary table relating to a program consisting of 5 functions and the associated measured characteristic values Number, Cumulative Time and Own Time.

FIG. 2 shows an exemplary first call tree with associated diagram, and

DETAILED DESCRIPTION OF INVENTION

For a detailed description of FIG. 1 the reader is referred to the introduction to the description.

FIG. 2 shows a first exemplary call tree on the left-hand side. The program is started with a main function (or top level function) at the call level 0, called function A in this case. This is characterized firstly in that it is not called by any other function. In the graphic on the right, A initially occupies the entire area (dark hatching). The function then calls functions B and E (with no indication initially being given by the graphic as to how the calls are correlated in time, i.e. whether, for example, B and E run in parallel or are processed sequentially. The same then applies to the next call level 1, in which function B calls functions C and D and function E calls functions F and G.

On the right-hand side of the figure in the graphic according to the application, the total area of function A is now initially subdivided into the two vertical blocks B and E (somewhat lighter hatching), which in the present case subdivide the area of A into equal parts. This is pure chance, however, since the area distribution of B and E is dependent on the chosen characteristic variable. In other words, the area of B may also be substantially smaller or substantially greater than that of E.

In the next step in the generation of the representation the next hierarchy level of the calls is created, which again subdivides the representative areas of functions B and E in the same way in each case, as already described. Thus, all call levels (insofar as desired or defined) are processed recursively and the representation depth progressively refined.

Figure 3:
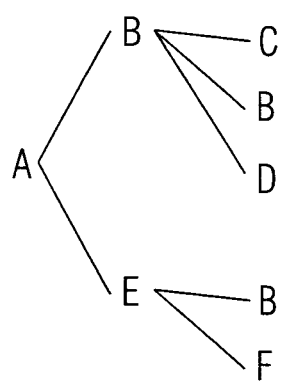
FIG. 3 shows a further exemplary call tree with associated diagram.
Figure 3:
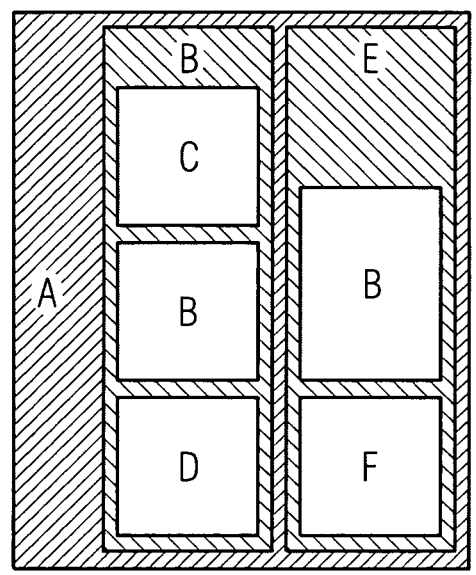

FIG. 3 differs from FIG. 2 in that function B in the next call level contains an additional call of itself and function E also contains a call of function B. No distinction is made during the calculation of the representation; the call tree can have all possible forms in this case. As a result of the graphical representation, (undesired) loops can be recognized even more easily therein than in the traditional table presentation. Moreover, it is also clearly recognizable in FIG. 3 that the area of function B within function E is larger than within function B and also that the areas of the individual functions C, B, D and F each have different sizes.

This could also be an image of the representation of the same program at a later point in time, in which function G has been processed to completion and in its place new functions have been called in each case.

An exemplary application is in the development of controls in systems and plant engineering.

A multiplicity of functions and variables can be monitored here, a small number of which are listed in the following by way of example:

One FB is designed for the use of an inverter for controlling a rotary motion for gearing mechanisms with a fixed pitch. There is only one position switch for switching off from both directions.

When accelerating from a defined position, as well as when switching off by means of the position switch, the value (RAMPE_POS) is used (should equal 100 ms). When accelerating from an undefined position (RAMPE_AUF) and when stopping in an undefined position the value (RAMPE_AB) is used.

When continuing from an undefined position the speed (V_LANGSAM) is output.

A further FB controls arrival points up to 3 departures

The module handles the control of arrival points with the associated wait block.

There is one FB for monitoring pressure and flow faults, integration of a timing deviation control Visualization, control and troubleshooting for adhesion faults is evaluated by an FB The next FB requests the address of internal structures from its instance DB by passing it as INPUT parameter <Structur>.

The DB, the start (DW) and the length of the structure is returned via the ANY pointer analysis!

One value can be used for the energy consumption measurement

Or also for current consumption measurement

The current consumption is measured by means of an electricity meter. Depending on the setting on the meter, the current pulses can correspond to the following values:

0.01 kWh per pulse
0.10 kWh per pulse
1.00 kWh per pulse
10.00 kWh per pulse
100.00 kWh per pulse Description of the identifiers:

| | |
|---|---|
| Current pulse: | Electricity meter pulses |
| Shift changeover: | Bit to reset the counter values at change of shift |
| Resolution: | Resolution according to the setting of the electricity meter |
| Consumption: | Consumption in the current shift; can be parameterized directly or onto data word in the DB 21 if more than one electricity meter is present. |
| Data: | Operating data in the DB 21 |

The air consumption measurement Analog can be monitored.

The air consumption is measured by means of an analog sensor at one-second intervals (sensor can supply 4 to 20 mA).

The nonlinearities of the sensor are compensated by this module with the aid of an approximation curve.

Description of the identifiers:

| | |
|---|---|
| IB_Run: | Interbus running |
| Sek_Takt: | One-second intervals M5.0 |
| AD_Wandler_Wort0/1_IN1/2: | Input words 0/1 of the A/D converter in mA (normalized) from analog converter IB IL AI 8/SF. |
| Shift changeover: | Bit to reset the counter values at change of shift |
| DB_Daten_1/2: | Operating data in the DB 22 |

By way of example also the control of motor switches

This module handles the following functions:
1. Parameterization of the motor current
2. Release of the status word switchover
3. Acknowledgement of fault messages
4. Suppression of the fault message when power disconnected
5. Control of the motor and the 24 V output

The invention claimed is:

1. A processor-executed method for evaluating characteristic values of functions in an execution of a computer program, comprising:
   displaying a graphical representation of determined characteristic values associated with functions using a computer, wherein the graphical representation has a hierarchical structure dependent on a degree of call depth of the functions; and
   displaying an area in the graphical representation for each function using the computer, wherein a size of the area is dependent on the determined characteristic value of the function,
   wherein the hierarchical structure is performed such that
      a main function occupies an entire representation area,
      a first call level of first functions subdivides the area of the main function, and
      a second call level of second functions subdivides an area of the first call level of first functions, and
   wherein any following call level of functions subdivides an area of a previous call level of functions in a defined manner, and
   wherein subdivisions of areas are performed horizontally and vertically in alternation.

2. The method as claimed in claim 1, wherein each area is subdivided according to a tree mapping algorithm.

3. The method as claimed in claim 1, wherein each function is called at least once.

4. The method as claimed in claim 1, wherein the characteristic value is the total execution time of the function.

5. The method as claimed in claim 1, wherein the characteristic value is the execution frequency of the function.

6. The method as claimed in claim 1, wherein a three-dimensional four of representation is chosen in which each area is determined according to a first characteristic value and a height is determined according to a second characteristic value.

7. The method as claimed in claim 1, wherein a three-dimensional cushion shape form of representation is chosen in which each area is determined according to a first characteristic value and a height is determined according to a second characteristic value.

8. The method as claimed in claim 1, wherein filter options are used to reduce the represented volume of data.

9. The method as claimed in claim 1, wherein each displayed area is adjusted dynamically during a runtime to match a newly determined characteristic value.

10. The method as claimed in claim 1, wherein an application of the method is realized in an automation environment.

* * * * *